Nov. 15, 1966 J. A. MASON 3,285,374
MAGNETIC BRAKE WITH MANUAL RELEASE
Filed Oct. 23, 1964 3 Sheets-Sheet 1
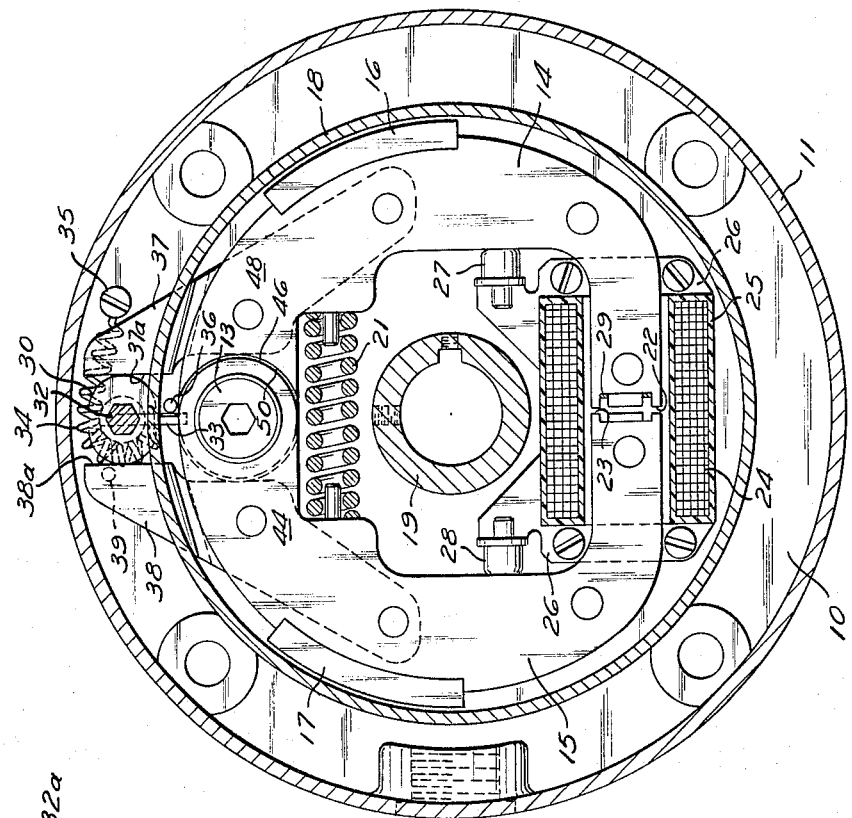
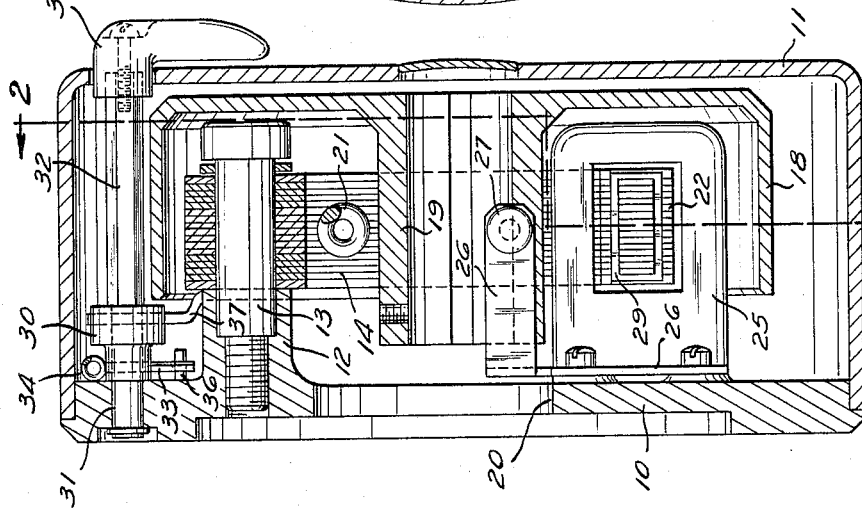
INVENTOR.
JAMES A. MASON
BY
Ely, Golrick & Flynn
ATTORNEYS INVENTOR.
JAMES A. MASON
BY
Ely, Golrick & Flynn
ATTORNEYS Nov. 15, 1966  J. A. MASON  3,285,374
MAGNETIC BRAKE WITH MANUAL RELEASE
Filed Oct. 23, 1964  3 Sheets-Sheet 3

INVENTOR.
JAMES A. MASON
BY
Ely, Golrick & Flynn
ATTORNEYS

# United States Patent Office 3,285,374
Patented Nov. 15, 1966

3,285,374
MAGNETIC BRAKE WITH MANUAL RELEASE
James A. Mason, Shaker Heights, Ohio, assignor to Fawick Corporation, a corporation of Michigan
Filed Oct. 23, 1964, Ser. No. 406,125
11 Claims. (Cl. 188—171)

This invention relates to an electromagnetically operated brake, particularly a spring-applied electromagnetically-released brake.

The brake of the present invention is particlarly advantageous for braking a fractional horsepower electric motor automatically. When the motor is energized, the electromagnetically-operated release in the brake causes it to release the motor; conversely, as soon as the motor is de-energized, the electromagnetically-operated release in the brake also is de-energized, enabling the brake to be spring-applied.

A principal object of this invention is to provide a novel manual release arrangement in a brake of this type.

Another object of this invention is to provide such a manual release arrangement which is automatically reset the next time the electromagnetic release for the brake is energized.

Anothetr object of this invention is to provide such a manual release arrangement which gives an indication of the wear of the frictional material on the brake shoes without necessitating removal of the cover of the brake.

Another object of this invention is to provide such a manual release arrangement in a brake of this type which limits the brake-engaging travel of the brake shoes and prevents them from scoring the brake drum.

Another object of this invention is to provide such a manual release arrangement in a brake of this type which enables the use of a brake drum having heat-radiating fins.

Another object of this invention is to provide in a magnetic brake a novel arrangement for preventing cocking of the pivoted brake shoes.

Further objects and advantages of this invention will be apparent from the following detailed description of two presently-preferred embodiments thereof, which are illustrated in the accompanying drawings:

In the drawings:

FIGURE 1 is a vertical axial section through a first embodiment of the present brake;

FIGURE 2 is a cross-section taken along the line 2—2 in FIG. 1, showing the position of the parts when the manual release is turned to release the brake;

Figure 4:
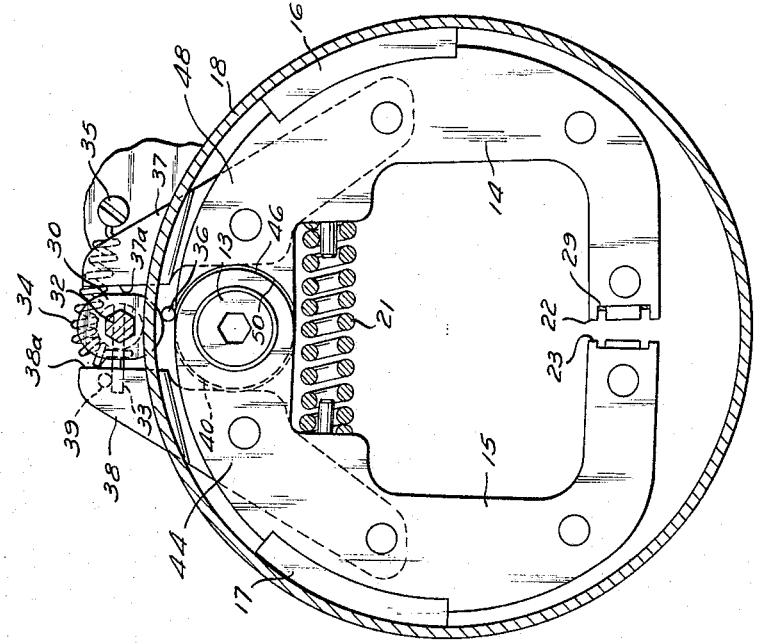
FIGURE 4 is a view similar to FIG. 3, showing the manual release turned to permit the brake to be spring-engaged.

Referring first to FIG. 1, the brake shown therein comprises a housing including a rigid back plate 10 and a generally cup-shaped cover 11 attached thereto. The back plate has an internal, longitudinally inwardly extending, annular boss 12 which supports a pivot pin 13. The pivot pin extends horizontally forward within the brake housing. A pair of oppositely facing, laminated, ferromagnetic brake shoes 14 and 15 of generally C-shaped configuration are both pivoted at their upper ends on this pivot pin 13.

These shoes carry respective outwardly-facing brake linings or wear pads 16 and 17 of suitable frictional material for engagement with the inside of a brake drum 18. The brake drum has a central axial hub 19 which is adapted to be mounted on a shaft (not shown) extending rotatably through a central opening 20 in the backplate 10 of the brake housing. This shaft may be the shaft of an electric motor, for example.

The present brake is normally spring-applied by means of a relatively stiff main spring 21 (FIG. 2), which is engaged under compression between the brake shoes 14 and 15 at a location below the common pivot 13 for both brake shoes. This main spring urges both brake shoes laterally outward for braking engagement of their respective wear pads 16 and 17 with the brake drum 18.

At their lower ends in FIG. 2 the respective brake shoes 14 and 15 present confronting pole tips 22 and 23, which are spaced apart from each other when the brake is engaged (FIG. 4). An electromagnetic coil 24 surrounds, and is inductively coupled to, the lower ends of the brake shoes. This coil is enclosed in a dielectric housing 25 carried by a bracket 26, which is bolted to the inside face of the back wall 10 of the brake housing. This bracket also carries laterally disposed, compressible, resilient centering bumpers 27 and 28 of rubber or the like which the insides of the respective brake shoes 14 and 15 engage when the brake is released. These bumpers limit the laterally inward movement of the brake shoes and position the latter when the coil 24 is being mounted on the bracket 26 so as to be properly positioned with respect to the brake shoes.

The brake shoe 14 carrier a short-circuit shading coil 29 at its pole tip 22.

Figure 3:
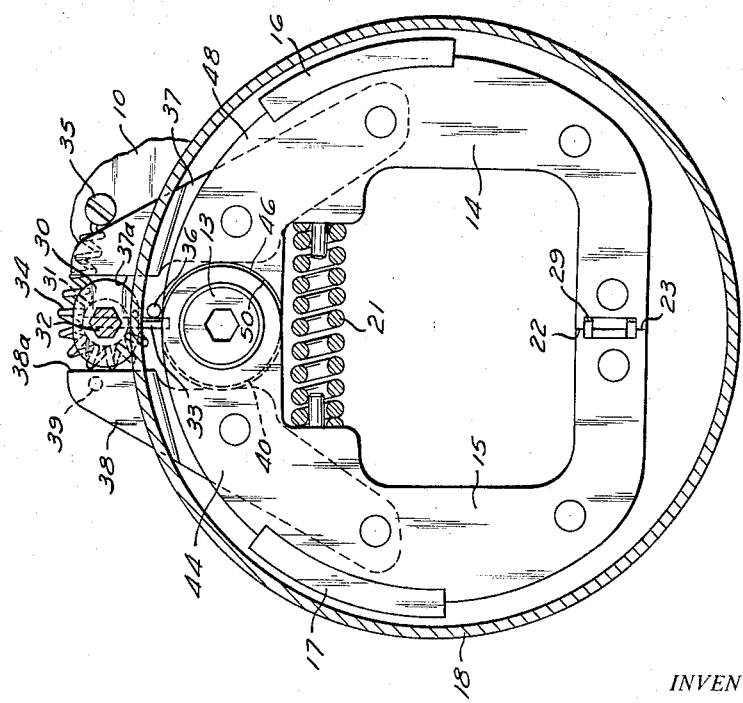
FIGURE 3 is a view similar to FIG. 2, but with certain parts omitted for simplicity, showing the brake released when the coil is energized.

The brake shoes 14 and 15 together provide a ferromagnetic circuit for magnetic flux having an air gap between the pole tips 22 and 23. When the coil 24 is energized, these pole tips are drawn together to close this air gap. This condition is shown in FIG. 3, from which it will be apparent that the brake shoe 14 has rocked (from the FIG. 4 position) clockwise about pivot pin 13 and the other brake shoe 15 has rocked counterclockwise about pivot pin 13 until the pole tips 22 and 23 engage each other. This laterally inward movement of the brake shoes retracts both wear pads 16 and 17 from the brake drum 18, as well as compressing the main spring 21 further. Also, the centering bumpers 27 and 28 are slightly compressed by this inward movement of the brake shoes.

When the coil 24 is de-energized, the brake-applying main spring 21 forces the brake shoes 14 and 15 apart to the position shown in FIG. 4, wherein their respective wear pads 16 and 17 are in frictional, torque-sustaining engagement with the brake drum, so that the brake is fully engaged.

In accordance with the present invention, this brake is provided with a novel manual release arrangement by which the brake can be released manually whenever desired, without the necessity of energizing the coil 24.

Referring to FIG. 1, this release arrangement includes a release cam 30 mounted on a longitudinally disposed shaft 31, which is rotatably mounted in the back wall 10 of the housing. An operating handle 32a for the cam is disposed in front of the cover 11. This handle has a rearwardly projecting extension 32 extending longitudinally of the assembly outside the brake drum 18 and having its back end rigidly attached to the release cam 30. This extension 32 is spaced vertically above the pivot pin 13 for the brake shoes 14 and 15. The cam 30 is of oblong, rounded configuration presenting a major diameter portion and a minor diameter portion disposed perpendicular to one another.

The cam carries a cross pin 33. A coil spring 34 is connected at one end to this cross pin and at its opposite end to a mounting screw 35 on the back plate 10 of the brake housing. This spring is under tension and it urges the unitary assembly of cam 30 and operating handle 32, 32a clockwise in FIGS. 2, 3 and 4. A stop pin 36 projects forward from the back plate 10 of the brake housing in the path of the cross pin 33 when the cam is turned counterclockwise, against the urging of spring 34. As shown in FIGS. 1 and 3, this stop pin limits the extent to which the cam can be turned counterclockwise. In this extreme counterclockwise position of the cam, its major diameter portion is disposed horizontal and its minor diameter portion is vertical, as shown in FIGS. 1 and 3.

A pair of rigid arms 37 and 38 is rigidly attached to the brake shoes 14 and 15, respectively, and extends upward therefrom on opposite sides of cam 30, as shown in FIGS. 2–4. These arms constitute cam followers for engagement by the cam, when the latter is rotated, in order to release the brake manually. These cam follower arms 37 and 38 present inside flat faces 37a and 38a which are disposed substantially vertical and are engageable with the opposite sides of the cam. The cam follower arm 38 carries a stop pin 39 which is engageable by the cross pin 33 on the cam to limit the clockwise rotation of the cam under the urging of the return spring 34. In its extreme clockwise position (FIG. 4), the minor diameter portion of the cam is disposed horizontal between the cam follower faces 37a and 38a and its major diameter portion is vertical.

As shown in FIG. 4, when the coil 24 is de-energized and the cam 30 is in its normal, extreme clockwise, position, the brake-applying main spring 21 spreads the brake shoes 14 and 15 apart for frictional torque-sustaining engagement of the wear pads 16 and 17 with the inside of brake drum 18. When the wear pads are new, as shown in FIG. 4, with the brake fully engaged, the upper ends of the cam follower arms 37 and 38 will be spaced laterally from the opposite sides of the minor diameter portion of the cam.

In order to release the brake manually, the operator grasps the handle 32a and turns it counterclockwise. After the cam 30 has turned a sufficient extent, its major diameter portion will begin to engage the cam follower arms 37 and 38 and will spread them apart progressively. This causes the brake shoes 14 and 15 (to which the arms 37 and 38 are connected rigidly) to be retracted inwardly against the force of the main spring 21, thereby disengaging the wear pads 16 and 17 from the brake drum and releasing the brake.

The operating handle 32, 32a and cam 30 are turned counterclockwise a full 90°, to the position shown in FIG. 2, where the major diameter portion of the cam is disposed horizontal between the cam follower faces 37a and 38a. At this point the stop pin 36 is engaged by the cross pin 33 carried by the cam. In this position, while the brake is released, there is still a slight air gap between the pole tips 22 and 23 of the brake shoes 14 and 15.

Referring to FIG. 3, if the coil 24 is energized now it will draw the pole tips of the brake shoes together, closing this air gap and also moving the cam follower arms 37 and 38 apart from the cam 30 a sufficient distance to permit the cam to be returned by its spring 34 clockwise 90° from its position in FIGS. 2 and 3, where its major diameter portion is horizontal, to its position in FIG. 4, where its major diameter portion is vertical. In this manner, the manual release arrangement is automatically reset to its position in which it does not prevent the main spring 21 from applying the brake. The stop pin 39 on cam follower arm 38 is engaged by the cross pin 33 on cam 30 to define this limit position of the cam.

From the foregoing, it will be apparent that this manual release arrangement is rugged and relatively simple in construction and mode of operation, and is automatically reset in response to energization of the electromagnet coil.

A particular advantage of this manual release arrangement is that it also gives an indication of the wear which has taken place on the wear pads 16 and 17. The greater the wear, the closer will be the upper ends of the cam follower arms 37 and 38 to the opposite sides of the cam 30 when the brake is engaged, as shown in FIG. 4. Therefore, the sooner the cam encounters the load of the brake-applying spring 21 when the handle 32, 32a is turned counterclockwise from the FIG. 4 position to release the brake manually, the more wear has taken place on the wear pads 16 and 17. This gives the user a reliable indication, without having to remove the cover 11, of when the wear pads have become sufficiently worn to require replacement.

As shown in FIG. 4, the minor diameter portion of the cam constitutes a positive limit stop for the cam follower arms 37 and 38 when the brake is applied. Therefore, in this position the cam positively limits the extent to which the brake shoes 14 and 15 can move outward, and therefore it prevents scoring of the brake drum in the event that the wear pads 16 and 17 become worn excessively.

Figure 5:
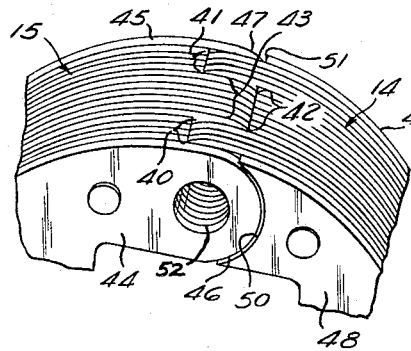
FIGURE 5 is an enlarged fragmentary perspective view showing the pivoted ends of the magnetic brake shoes in the present brake.

As shown in FIG. 5, the upper end of the laminated brake shoe 14 presents a pair of axially spaced, projecting, front and back ears 40 and 41 separated by a recess 42. The other laminated brake shoe 15 presents a single projecting middle ear 43, which projects into the recess 42 and is snugly received therein between the front and back ears 40 and 41 on brake shoe 14, and front and back recesses which snugly receive the ears 40 and 41 on brake shoe 14. Brake shoe 15 also has end plates 44 and 45 terminating in projecting rounded ears 46 and 47. Brake shoe 14 has end plates 48 and 49 with concave end faces 50 and 51 which snugly receive the rounded ears 46, 47 on the end plates of brake shoe 15. The interfitting ears 40, 41 and 43 have aligned openings 52 which receive the common pivot pin 13 for the two brake shoes. The respective projecting ears 40 and 41 on brake shoe 14 present rounded convex end faces which have a relatively close clearance from confronting, complementary, concave, rounded end faces on the other brake shoe 15. The same relationship is provided between the convex rounded end face of the middle ear 43 on brake shoe 15 and the concave end face of the central recess 42 in brake shoe 14.

With this arrangement, the brake shoes interfit closely at their respective upper ends, where they are mounted on the same pivot pin 13, and they are substantially co-extensive with one another from front to back in the brake housing. That is, the front face of brake shoe 14 is substantialy coplanar with the front face of brake shoe 15, and this is also true of their respective back faces. Also, the respective wear pads 16 and 17 on the brake shoes are aligned with each other from front to back of the assembly. Consequently, neither brake shoe can become cocked on the pivot post 13; both remain with their major faces perpendicular to the axis of pivot pin 13. This insures maximum braking effectiveness of the wear pads 16 and 17 against the brake drum 18 when the brake is applied.

Figure 6:
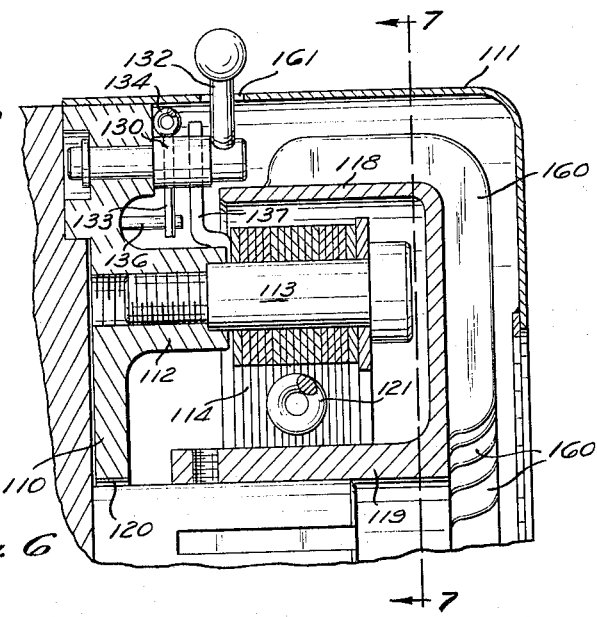
FIGURE 6 is a vertical axial half-section through a second embodiment of the present brake.
Figure 7:
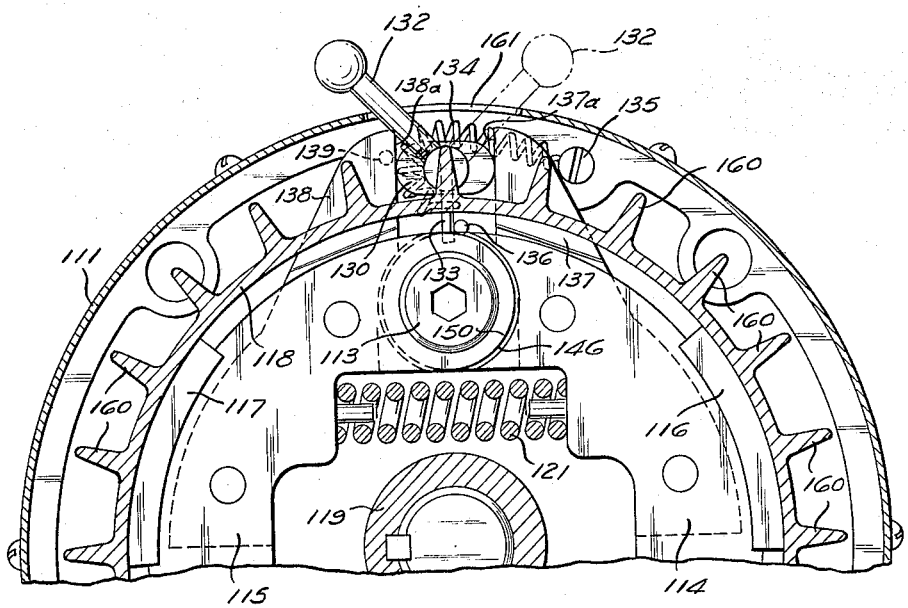
FIGURE 7 is a cross-section taken along the line 7—7 in FIG. 6, showing the position of the parts when the manual release is turned to release the brake.

FIGURES 6 and 7 show a second embodiment of the present invention which is particularly advantageous in that it enables the use of a brake drum having heat-dissipating fins. Except for these fins on the brake drum and the handle for the release cam, the brake of FIGS. 6 and 7 is essentially identical to that of FIGS. 1–5, and corresponding elements are given the same reference numerals, plus 100, as those in FIGS. 1–5.

In FIGS. 6 and 7 the brake drum 118 has a plurality of external, radially disposed, heat radiating fins 160 at the front of the brake drum and continuing across its outer periphery. The cover 111 is slightly larger than in FIGS. 1–5 in order to accommodate these fins. By dissipating the frictionally generated heat from the brake drum, these fins enhance the effective torque capacity of the brake.

In order to avoid interference with these fins 160, the handle 132 for the release cam 130 extends transverse to the axis of the assembly rather than parallel thereto as in FIGS. 1–5. As shown in FIG. 6, the handle 132 is at the back end of the brake drum 118 and completely behind the fins 160 on the brake drum. This handle passes through an arcuate slot 161 formed in the top of the cover 111 close to the release cam.

FIGURE 7 shows the release cam 130 and its operating handle 132 in full lines in the brake-releasing position. The phantom-line position of handle 132 in FIG. 7 is its position when the cam 130 is ineffective to release the brake.

In order to release the brake manually, all that is necessary is to turn the handle 132 90° from the phantom line position to the full line position in FIG. 7. This causes the release cam 130 to turn 90° from a position in which its minor diameter portion is between the cam follower arms 137 and 138 to a position in which its major diameter portion is between the cam follower arms to release the brake.

From the foregoing description and the accompanying drawings, it will be apparent that the particular embodiments disclosed are well suited for the accomplishment of the purposes of this invention. However, while two presently preferred embodiments have been disclosed herein, it is to be understood that the invention is susceptible of other structural embodiments and that various modifications, omissions and refinements which depart from the disclosed embodiments may be adopted without departing from the spirit and scope of this invention.

I claim:

1. A magnetic brake comprising a brake drum, a pair of ferromagnetic brake shoes inside said brake drum, pivot means pivotally supporting said brake shoes, said brake shoes presenting confronting pole tips at one side of said pivot means, electrically energizable coil means inductively associated with said brake shoes for drawing their pole tips together in response to energization of the coil means so as to retract the brake shoes inwardly from the brake drum, main spring means urging the brake shoes outwardly for braking engagement with the brake drum, and a manually operable release for retracting said brake shoes inwardly from the brake drum against the urging of said main spring means, said release comprising manually rotatable cam means at the opposite side of said pivot means from said pole tips, and cam follower means coupled to said brake shoes and extending on said opposite side of said pivot means for engagement by said cam means, said cam means being rotatable in one direction to move said cam follower means in a direction effective to retract said brake shoes inwardly from the brake drum.

2. A brake according to claim 1, wherein there is provided a return spring biasing said cam means in the opposite direction and effective to return the cam means in said opposite direction when said coil means is energized.

3. In a magnetic brake having a brake drum, a pair of oppositely disposed, generally C-shaped, ferromagnetic brake shoes inside said brake drum, frictional wear pads on said brake shoes in confronting relationship to the brake drum, pivot means supporting both said brake shoes at one end thereof, said brake shoes presenting confronting pole tips at their opposite ends, coil means surrounding said brake shoes at said last-mentioned opposite ends and energizable to draw said pole tips together to retract said brake shoes inwardly from the brake drum, and main spring means urging said brake shoes outwardly for braking engagement of said wear shoes with the brake drum, the improvement which comprises:

manually operable cam means rotatable on an axis disposed in spaced parallel relationship to said brake shoe pivot means at the opposite side of the latter from said pole tips of the brake shoes;

a pair of cam followers respectively connected rigidly to said brake shoes and extending therefrom at said opposite side of said brake shoe pivot means on opposite sides of said cam means for engagement by the cam means when the latter is turned;

said cam means when turned in one direction spreading said cam followers apart to thereby turn said brake shoes inwardly on said brake shoe pivot means to retract the wear pads from the brake drum.

4. In a magnetic brake having a brake drum, a pair of oppositely disposed, generally C-shaped ferromagnetic brake shoes inside said brake drum, frictional wear pads on said brake shoes in confronting relationship to the brake drum, pivot means supporting both said brake shoes at one end thereof, said brake shoes presenting confronting pole tips at their opposite ends, coil means surrounding said brake shoes at said last-mentioned opposite ends and energizable to draw said pole tips together to retreat said brake shoes inwardly from the brake drum, and main spring means urging said brake shoes outwardly for braking engagement of said wear pads with the brake drum, the improvement which comprises a manual release for the brake including:

a cam rotatable on an axis disposed in spaced parallel relationship to said brake shoe pivot means at the opposite side of the latter from said pole tips of the brake shoes, manually engageable means connected to said cam for turning the latter, said cam having a minor diameter portion and a major diameter portion extending transverse to said minor diameter;

a pair of cam follower arms respectively connected rigidly to said brake shoes and extending therefrom at said opposite side of the brake shoe pivot means on opposite sides of the cam for engagement by the latter;

said cam, when positioned in a first position in which its minor diameter portion extends between the cam follower arms, permitting said main spring means to position said brake shoes outwardly for braking engagement of the wear pads with the brake drum;

said cam, when turned in one direction from said first position to a second position, in which its major diameter portion extends between the cam follower arms, progressively spreading said cam follower arms apart to retract the brake shoes inwardly away from the brake drum against the urging of said main spring means.

5. The brake of claim 4, wherein there is provided a cam return spring biasing said cam to said first position thereof.

6. The brake of claim 4, wherein there are provided a limit stop preventing the cam from being turned in said one direction beyond said second position thereof, and a limit stop preventing the cam from turning in the opposite direction beyond said first position thereof.

7. The brake of claim 4, wherein each of said brake shoes is a laminated body, one of said brake shoes at said one end thereof terminates in spaced front and back ears and a recess between them, the other of said brake shoes at said one end thereof terminates in a middle ear, received snugly in said recess between the front and back ears of said one brake shoe, and front and back recesses which snugly receive said front and back ears, and said pivot means extends through said front, back and middle ears on the brake shoes and supports the brake shoes pivotally thereat.

8. A brake according to claim 4, wherein said brake drum has a plurality of external heat-radiating fins thereon, and wherein there is provided an operating handle connected to said cam and extending therefrom transverse to the axis of the brake drum and spaced from said fins.

9. A brake according to claim 4, wherein there is provided an operating handle connected at one end to said cam and extending therefrom longitudinally of the brake outside the brake drum.

10. A magnetic brake having a brake drum, a pair of oppositely disposed, generally C-shaped, ferromagnetic brake shoes inside said brake drum, a pivot post supporting both said brake shoes pivotally at one end thereof for movement inwardly away from the brake drum and for movement outwardly toward the brake drum, one of said brake shoes at its pivotally mounted end terminating in front and back projecting ears and a recess between them, the other of said brake shoes at its pivotally mounted end terminating in a middle projecting ear, which is snugly received in said recess between the front and back ears of said one brake shoe, and front and back recesses, which respectively snugly receive said front and back ears, said pivot post extending through said front, back and middle ears on the respective brake shoes and supporting the brake shoes pivotally thereat, said snugly interfitting ears and recesses on the brake shoes preventing cocking of either brake shoe about said pivot post, said brake shoes at the opposite end of each presenting confronting pole tips, coil means surrounding said brake shoes at said last-mentioned opposite ends and energizable to draw said pole tips together to pivot the brake shoes inwardly away from the brake drum, and main spring means urging said brake shoes outwardly for braking engagement with the brake drum.

11. A magnetic brake having a brake drum, a pair of oppositely disposed, generally C-shaped, ferromagnetic brake shoes inside said brake drum, a pivot post supporting both said brake shoes pivotally at one end thereof for movement inwardly away from the brake drum and for movement outwardly toward the brake drum, one of said brake shoes at its pivotally mounted end terminating in projecting ears and a recess between them, the other of said brake shoes at its pivotally mounted end terminating in recesses, which snugly receive said ears on said one brake shoe, and a projecting ear between said last-mentioned recesses, which is snugly received in said recess on said one brake shoe, said pivot post extending through said ears on the respective brake shoes and supporting the brake shoes pivotally thereat, said snugly interfitting ears and recesses on the brake shoes preventing cocking of either brake shoe about said pivot post, said brake shoes at the opposite end of each presenting confronting pole tips, coil means surrounding said brake shoes at said last-mentioned opposite ends and energizable to draw said pole tips together to pivot the brake shoes inwardly away from the brake drum, and main spring means urging said brake shoes outwardly for braking engagement with the brake drum.

References Cited by the Examiner

UNITED STATES PATENTS

| 1,024,489 | 4/1912 | Aalborg | 188—171 |
| 2,126,849 | 8/1938 | Weiss | 188—170 |

FOREIGN PATENTS

| 541,310 | 11/1941 | Great Britain. |

DUANE A. REGER, *Primary Examiner.*